US005138147A

United States Patent [19]

van Aller et al.

[11] Patent Number: 5,138,147

[45] Date of Patent: Aug. 11, 1992

[54] PROXIMITY X-RAY IMAGE INTENSIFIER TUBE

[75] Inventors: Gerardus van Aller; Guido T. M. Mulder; Engelbertus Rongen, all of Heerlen, Netherlands

[73] Assignee: U.S. Philips Corporation, New York, N.Y.

[21] Appl. No.: 650,521

[22] Filed: Feb. 5, 1991

[30] Foreign Application Priority Data

Feb. 5, 1990 [NL] Netherlands ........................ 9000267

[51] Int. Cl.[5] ........................................ H04N 5/32

[52] U.S. Cl. ........................ 250/213 VT; 378/99

[58] Field of Search ............... 250/213 VT; 378/99; 358/111

[56] References Cited

U.S. PATENT DOCUMENTS

| | | | |
|---|---|---|---|
| 3,699,375 | 10/1972 | Weibel | 357/29 |
| 3,825,763 | 7/1974 | Ligtenberg et al. | 250/486 |
| 4,300,046 | 10/1981 | Wang | 250/213 VT |
| 4,365,269 | 12/1982 | Haendle | 358/111 |
| 4,447,721 | 5/1984 | Wang | 250/213 |
| 4,471,378 | 9/1984 | Ng | 358/111 |
| 4,599,740 | 7/1986 | Cable | 378/99 |
| 4,842,894 | 6/1989 | Ligtenberg et al. | 427/65 |
| 4,855,587 | 8/1989 | Creusen et al. | 250/213 |

FOREIGN PATENT DOCUMENTS

| | | |
|---|---|---|
| 1064073 | 4/1967 | United Kingdom . |
| 1392356 | 4/1975 | United Kingdom . |

*Primary Examiner*—Carolyn E. Fields
*Attorney, Agent, or Firm*—William Squire

[57] ABSTRACT

An X-ray image intensifier tube includes an entrance screen with a photocathode and, opposite thereto and at a slight distance therefrom, is a detection screen for detecting entrance image signals intensified by the proximity tube. The detection screen comprises a phosphor layer and an integrated matrix of detection elements within the tube envelope. The detection screen can be read in a location-sensitive manner and produces signals which can be directly electrically processed. The detection screen may be provided with a metal layer enabling brightness control and be mounted completely or partly outside the tube. The tube is assembled using low-temperature thermocompression seals wherever desired. The latter is applicable to the tube seal, so that the risk of deactivation of the photocathode is avoided.

12 Claims, 2 Drawing Sheets

PROXIMITY X-RAY IMAGE INTENSIFIER TUBE

FIELD OF THE INVENTION

The invention relates to an X-ray image intensifier tube, comprising an envelope which is to be evacuated and which comprises an entrance window and an exit wall portion, an entrance screen provided with a luminescent layer and a photocathode, a proximity electron intensifier system, and an exit screen for the detection of an electron beam emanating from the photocathode.

BACKGROUND OF THE INVENTION

An X-ray image intensifier tube of this kind is known from U.S. Pat. No. 4,447,721. A tube disclosed therein comprises, accommodated in an envelope having an entrance window and an exit window, an entrance screen provided with an entrance luminescent layer and a photocathode and an exit screen provided with a phosphor layer. Using a potential difference between the photocathode and the phosphor layer, a photoelectron beam is projected onto the exit screen in intensified form. The intensification is realized by electron acceleration. The entrance screen and the exit screen have substantially the same surface area in the described proximity tube. Even though the length of such an X-ray image intensifier tube is substantially reduced with respect to a tube comprising an imaging electron optical system, such an advantage is substantially lost again because, in the case of non-direct visual observation, an adequately efficient optical transfer of an exit image having a comparatively large surface area to, for example, a television pick-up tube, requires a comparatively great length. As opposed to direct visual observation, a further conversion of an optical image into an electronic image is also necessary.

SUMMARY OF THE INVENTION

It is an object of the invention to mitigate the above drawbacks; to achieve this, an X-ray image intensifier tube of the kind set forth in accordance with the invention is characterized in that the exit screen comprises an integrated matrix of detection elements for converting signals carried by photoelectrons into electric signals which can be read in a location-sensitive manner.

Because the exit screen in such an X-ray image intensifier tube supplies electrically readable image signals, no space will be required for further image transfer at the reading side of the tube and a short detection system can be realized also for comparatively large exit images.

The entrance screen of an X-ray image intensifier tube is, for example of the known type. Using a structured screen as disclosed in U.S. Pat. No. 3,825,763 and U.S. Pat. No. 4,842,894, resolution and radiation efficiency can be enhanced. The electron-optical system is preferably as short as possible and can realized, in accordance with the cited state of the art, using exclusively a potential difference between the entrance screen and the exit screen. In order to simplify intensification control in the tube, use can be made of a metal layer which has an adapted thickness and which is to be provided on the exit screen. A substantial brightness control range can thus already be achieved by way of a comparatively small variation of the potential difference. The effect of such a layer is disclosed in GB 1,392,356.

Instead of using electron intensification by acceleration, use can alternatively be made of an electron multiplier system, for example in the form of a channel plate intensifier as disclosed in GB 1,064,073. An advantage thereof consists in that substantially lower potential differences can be used, so that the brightness can be more readily controlled and the risk of undesirable electric discharges is reduced. In embodiments comprising an exit screen having a comparatively high inherent intensification smaller potential differences can thus be used, so that the advantages can also be achieved without using channel plate intensifier systems.

The exit screen of a preferred embodiment is provided with a phosphor layer in which the photoelectrons are converted into photons whereto photodiodes of the exit matrix are sensitive. The phosphor layer is preferably provided on the exit matrix, possibly via an intermediate optically transparent separating layer. The exit matrix is then preferably accommodated in the envelope. An exit intensifier of the envelope may also act as a separating layer. A drawback thereof consists in that the separating layer then also constitutes a vacuum wall so that it must be comparatively thick and may be susceptible to disturbing deformations. In order to reduce dispersion of light in an exit window, it can be constructed as a fibre-optical plate.

The exit matrix in a further preferred embodiment comprises a matrix of photodiodes which is preferably arranged in an orthogonal system, a switching element being associated with each diode, for example in the form of elements of a TFT system. Signals from individual photodiodes or possibly from diodes detecting photoelectrons are then transferred to drain conductors, for external reading by transistors in the TFT. An image can then be scanned, for example by sequential pulse application to successive gate conductors and, for example by shift register reading of each of the pulsed elements in the drain conductors.

In a further preferred embodiment a cylindrical sleeve portion of the envelope is connected to an entrance window and/or an exit wall portion by way of a thermocompression seal. The use of thermocompression seals is particularly attractive in the case of rectangular X-ray image intensifier tubes. Rectangular X-ray image intensifier tubes offer substantial advantages, because the image geometry thereof is adapted to customary image formats of detectors, monitors, etc. Thus, a more direct relationship can be realized between an orthogonal exit matrix and an image display device. X-ray image intensifier tubes in accordance with the invention can easily have a rectangular shape due to the absence of an electron-optical imaging system.

An entrance window of a tube in accordance with the invention may be made of aluminium, titanium, glassy carbon, a laminate as described in U.S. Pat. No. 4,855,587 and the like. Aluminium has a low absorption, but its limited strength may necessitate a comparatively thick window, so that additional dispersion occurs. Titanium is extremely strong, so that dispersion can be minimized. The cited advantages can be combined to a high degree when laminates and glassy carbon are used.

In order to achieve independence from a given dimensional stability of the entrance window, it is advantageous to provide the entrance screen material on a separate substrate to be mounted in the envelope. A supporting frame for such a screen is connected to the tube wall, for example by way of cams. A thermocompression seal can be formed between a customarily aluminium support for the luminescent screen and a relevant supporting frame. Notably the aluminium substrate, being comparatively thin for the sake of X-ray transmission, is fixed in the supporting frame by way of the thermocompression seal. To this end, the substrate is folded under tension around a corner of the frame so as to be attached at that area. Mechanical instability, such as local bending of the substrate, is thus precluded.

Using thermocompression seals, the entrance window which, as has already been stated, may consist of aluminium, titanium, glassy carbon or a laminate etc., can be connected to a preferably rectangular cylinder sleeve, being the side wall of the tube. A substantial advantage of thermocompression consists in that the joint is simultaneously formed along the entire circumference, thus avoiding undesirable deformation. The exit wall portion may be connected to the cylindrical sleeve in a similar manner. This joint customarily acts as a seal for the tube.

In the case of aluminium screens, such as used for the entrance window and the substrate for the luminescent layer, such a high temperature is required for thermocompression, lead being the intermediary, that recrystallization could occur in the aluminium, so that the strength of the screen is reduced. This is important notably for a window which acts as a vacuum wall. When tin or another material having a low melting point is used as an intermediate, a substantially lower temperature suffices for thermocompression, so that the risk of said recrystallization is precluded. When such a low-temperature thermocompression seal is used for mounting an exit wall portion, evaporation of antimony already present for the photocathode in the tube can be prevented. Tube assembly can thus be substantially simplified.

If one of the materials to be joined is not a metal but, for example a glassy material, a problem may occur in that the adhesion of tin to glass may be insufficient for low-temperature thermocompression. A solution in this respect consists in that the glassy material is first provided, for example by vapour deposition or a CVD process, with a metal layer at the area of a sealing face. After finishing of said metal layer, if necessary, the thermocompression seal can be realised as yet. This method can be used, for example when the cylinder sleeve consists of glass, the entrance window of glassy carbon or a laminate, or when the exit window is formed by a fibre-optical plate.

IN THE DRAWING

Some preferred embodiments in accordance with the invention will be described in detail hereinafter with reference to the drawing. Therein:

DESCRIPTION OF THE PREFERRED EMBODIMENT

Figure 1:
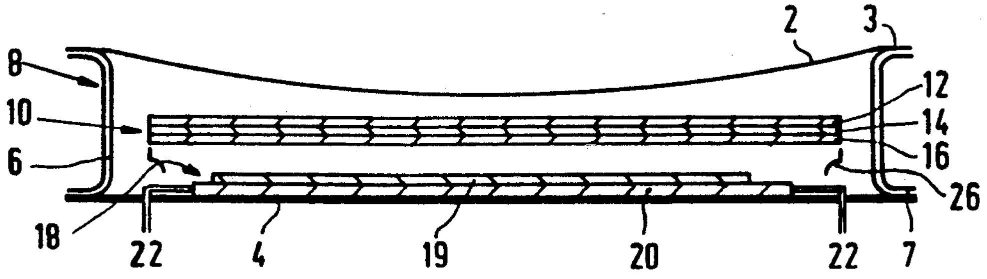
FIG. 1 shows a proximity tube in accordance with the invention which comprises an internal detection matrix.
Figure 2:
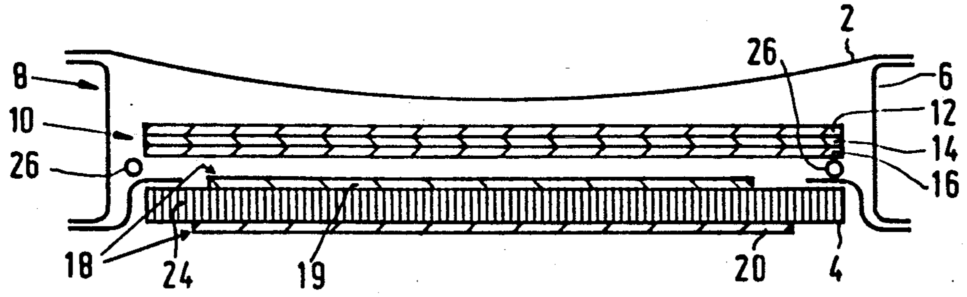
FIG. 2 shows such a tube which comprises an external detection matrix.
Figure 3:
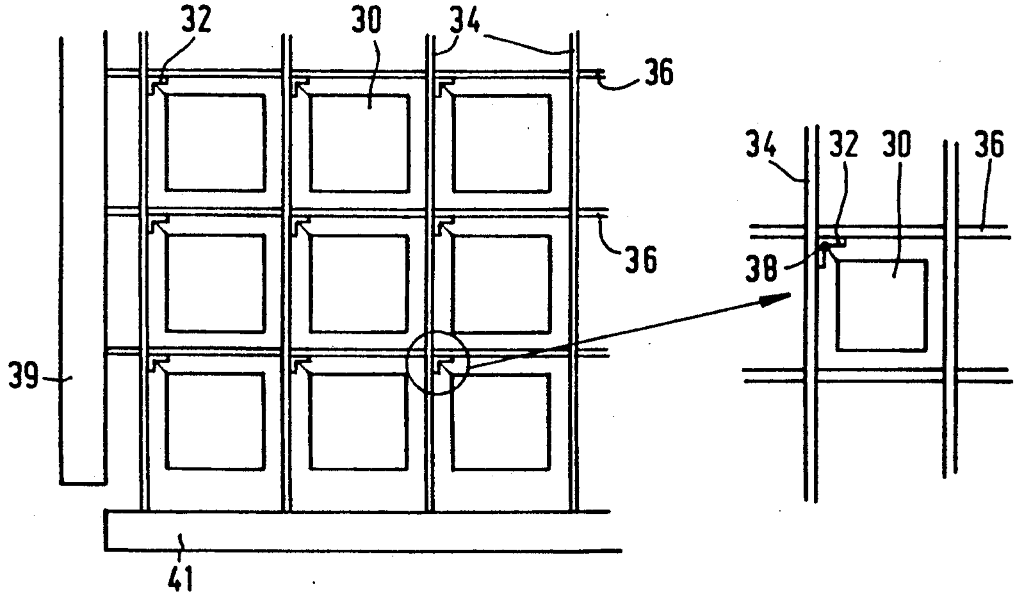
FIG. 3 shows an exit detection matrix of such a tube.

FIG. 1 shows a proximity tube which comprises an entrance window 2 which may consist of, for example aluminium, titanium, glassy carbon or a laminate as described in U.S. Pat. No. 4,855,587, and an exit wall portion 4 which in this case serves for vacuum separation and possibly as a supporting plate, so that it may be a metal plate. In solutions where a phosphor image is read on the outside of the tube, this wall portion is formed as an optical exit window and consists, for example as shown in FIG. 2, of a fibre-optical window. The two windows are joined by a cylindrical sleeve portion 6 which, contrary to known tubes, does not have a circular but preferably a rectangular or notably a square cross-section and which is made of, for example stainless steel. Using joints 3 and 7 to be described hereinafter, the entrance window 2, the exit wall portion 4 and the sleeve portion 6 constitute an envelope 8 to be evacuated which has, for example a thickness dimension of at the most 5 cm and a cross-section of, for example 40 cm×40 cm. The envelope accommodates an entrance screen 10 with an entrance phosphor screen 14 and a photocathode 16 provided on a support 12. The support is made of, for example aluminium and the phosphor layer consists of CsI as in known X-ray image intensifier tubes. At a distance of, for example from approximately 0.5 to 1 cm from the photocathode 16 there is arranged an exit screen 18 with a phosphor layer 19 and an integrated matrix of detection elements 20. The phosphor layer 19 is provided directly on the matrix 20, possibly via an intermediate optically transparent separating layer (not shown). In the present embodiment the matrix 20 is accommodated inside the envelope and can be read, via conductors 22, in a location-sensitive manner in, for example x-y coordinates. In contrast therewith, an embodiment as shown in FIG. 2 comprises a phosphor layer 19 which is provided on a fibre-optical window 24 and an optical image of which is read by means of a matrix 20 provided on an outer side of the window. Between the entrance screen and the exit screen of both types of tube there may be provided a shielding electrode 26 or a gauze electrode, for example in the form of a gauze or a shadow mask screen which extends across the entire screen surface. The electron-optical system may alternatively be formed by a channel plate multiplier arranged between the entrance screen and the exit screen. An advantage of a channel plate intensifier consists in that comparatively low potential differences can be used also for comparatively high intensifications, so that the tube is less susceptible to breakdowns. Moreover, in such a tube brightness control can be realized by variation of the potential difference between the entrance and the exit of the channel plate without giving rise to image artefacts.

A detection matrix 20 comprises, preferably arranged in an orthogonal structure, a number of, for example approximately 2000×2000 pixels, each of which has a dimension of, for example 0.2 mm×0.2 mm, and also comprises a corresponding number of photodiodes 30, a read circuit 32 being associated with each photodiode. The matrix thus comprises drain lines 34 and gate lines 36, so that each diode can be separately influenced in an x-y configuration. The gate lines, being the connections to a gate electrode 38 of, for example a thin-film transistor (TFT) as shown in FIG. 4, are connected to a multiplex line 39, the drain lines being connected to an integrated read line 41.

Figure 4:
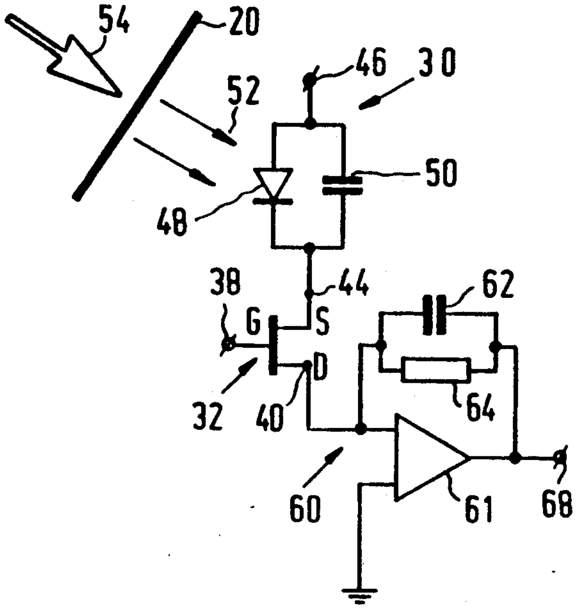
FIG. 4 shows a circuit diagram of an element of a detection matrix.

As is shown in FIG. 4, a source electrode 44 of the transistor 32 is connected via a photosensitive element or photodiode 30 to a supply electrode 46. The photodiode comprises a rectifying diode element 48 and a parallel capacitance 50. The photodiode 30 is in this case activated by a beam of photons 52 which originates from an exit screen 20 and which is released therefrom by a beam of photoelectrons 54 from the photocathode. FIG. 4 shows an amplifier 61, bridged by a capacitance 62 and a resistance 64, and an output terminal 68 of a read element 60 which is preferably integrated in a thin-film transistor unit. The diodes 30 may alternatively be constructed as photoelectron-detection elements.

Figure 5:
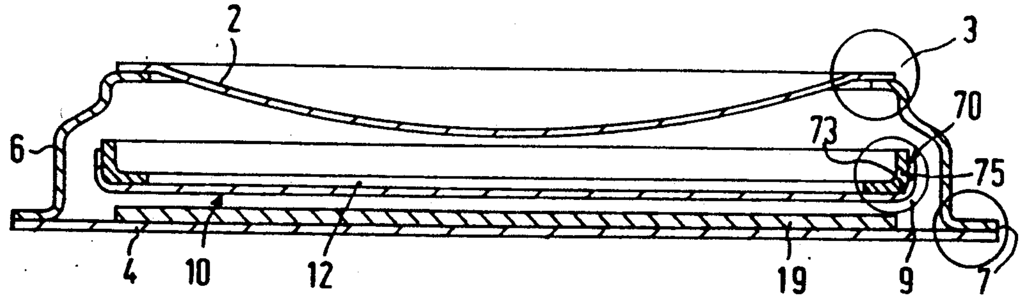
FIG. 5 and FIG. 6 show proximity tubes in accordance with the invention which comprise thermocompression seals.
Figure 6:
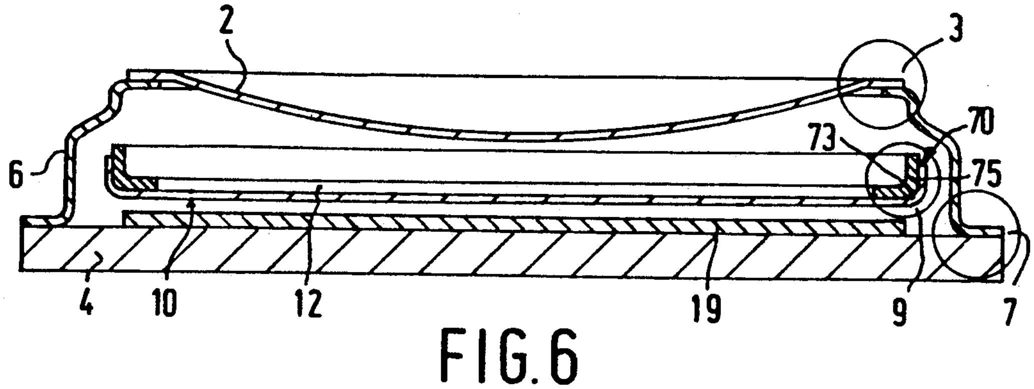

FIG. 5 and FIG. 6 are diagrammatic representations of the construction of X-ray image intensifier tubes in accordance with the invention, again comprising an entrance window 2, an exit wall portion 4, a sleeve 6, an entrance screen 10 and an exit screen 19. Between the entrance window and the sleeve there is provided a thermocompression seal 3, a thermocompression seal 7 being provided between the exit wall portion 4 and the sleeve 6. The latter seal also serves, for example as a seal for the tube. Seals of this kind are particularly suitable for rectangular tubes where sealing techniques such as argon arc welding can give rise to inadmissible deformations, notably due to local heating and the thermal aftereffects thereof. Similar problems, often in intensified form, occur in the making of glass-to-metal joints, for example as required for an embodiment comprising a glass, notably a fibre-optical, exit window as described. Thermocompression can be performed at comparatively low temperatures as a result of the use of an adapted intermediate material, and the entire seal is realized simultaneously along the entire circumference, so that the occurrence of deformation is avoided. Similarly, a support 12 for an entrance screen is connected to a supporting frame 70, via a thermocompression seal 9, so that the exit screen can be positioned in the sleeve of the tube housing in a suitably localized manner, for example via a cam joint. Because the exit screen in the present embodiment forms part of a proximity tube, the entrance screen thereof, and hence the support 12, should be suitably flat. For suitable X-ray transmission it is desirable that the support 12 is as thin as possible. These two requirements may readily result in lack of flatness and geometrical instability of the entrance screen. When the support 12 is fixed in the frame by way of a thermocompression seal 9 extending along the entire circumference as already described, optimum flatness and suitable geometrical stability are ensured. To achieve this, the support 12 is pulled around a corner 73 of a tubular supporting frame 70 and at the area of a cylinder circumference 75 of the supporting frame a thermocompression seal is formed all around. The entrance screen 10 can be provided on the combination of support 12 and supporting frame thus formed, after which the assembly can be mounted in an envelope which is still open at the exit side.

Thermocompression seals between, for example the aluminium of the entrance window or the entrance screen support 12 and a support made of chromium nickel steel are realized, using lead, at a temperature of approximately 300°. Such a high temperature may have an adverse effect on the strength of the aluminium. This is disadvantageous for the entrance window, notably because it is intended to act as a vacuum wall, and for the support 12 it is disadvantageous because local geometrical variations may occur. For thermocompression with aluminium use is made of an intermediate material having a low melting temperature, for example tin, so that the temperature during sealing may be lower. The aluminium then retains a so-called semi-hard property during the formation of the seal. In the case of thermocompression seals between glassy carbon or other materials for which tin exhibits poor adhesion, first a coating layer is provided at the area of a seal to be formed. Such a layer may be provided by vapor deposition, sputtering a chemical vapor deposition (CVD) technique. Between such an intermediate layer, possibly after undergoing a finishing treatment, and a further component a strong and vacuum tight seal can be realized by addition of tin and using a comparatively low temperature only.

The thermocompression seal 7 between an exit wall portion 4 and the sleeve 6 usually need not be realized at a comparatively low temperature, considering the materials to be joined. However, it is extremely attractive to use the described method also for such seals, because prior to the formation of the seal antimony can then be introduced for activation of the photocathode, without giving rise to the risk of evaporation during the formation of the seal 7.

What is claimed is:

1. An X-ray image intensifier tube, comprising an envelope which is to be evacuated and which comprises an entrance window and an exit wall portion, an entrance screen secured to the envelope and provided with a luminescent layer and a photocathode, a proximity electron-intensifier system and an exit screen secured to the envelope for the detection of an electron beam emanating from the photocathode, said exit screen comprising a phosphor layer and an integrated matrix of detection elements for converting image signals carried by photoelectrons into electric signals which can be read in a location-dependent manner, said phosphor layer being between the photocathode and the detection elements, said matrix of detection elements being accommodated in said envelope.

2. An X-ray image intensifier tube as claimed in claim 1, wherein the matrix of detection elements includes connections which read the matrix and which pass through the tube wall.

3. An X-ray image intensifier tube as claimed in claim 1 wherein the detection elements comprise photodiodes.

4. An X-ray image intensifier tube as claimed in claim 1 wherein the matrix of detection elements comprises an orthogonal matrix of photodiodes.

5. An X-ray image intensifier tube as claimed in claim 1 wherein the detection elements comprise a combination of a diode matrix and a thin-film transistor (TFT) integrated matrix of read switching elements.

6. An X-ray image intensifier tube as claimed in claim 1 wherein the tube has a rectangular shape.

7. An X-ray image intensifier tube as claimed in claim 6 wherein the tube envelope comprises a sleeve, an entrance plate and an exit plate, at least one of the entrance plate and the exit plate being connected to the sleeve by way of a thermocompression seal.

8. An X-ray image intensifier tube as claimed in claim 7 wherein said thermocompression seal comprises an intermediate material having a low melting point.

9. An X-ray image intensifier tube as claimed in claim 8, including a thermocompression seal which seals the tube between an exit wall portion and a sleeve portion.

10. An X-ray image intensifier tube as claimed in claim 7 wherein at least one of said entrance window and exit window includes an adhesive metal layer to form said thermocompression seal.

11. An X-ray image intensifier tube as claimed in claim 1 wherein the entrance luminescent layer is on a flat substrate attached to a mounting frame.

12. An X-ray image intensifier tube as claimed in claim 11, wherein the substrate is made of aluminium and is connected to the frame under tension by way of a thermocompression seal.

* * * * *